Aug. 30, 1932.   N. B. STONE   1,874,139
AUTOMATIC SPINDLE GRIP FOR DOORKNOBS
Filed Feb. 1, 1932
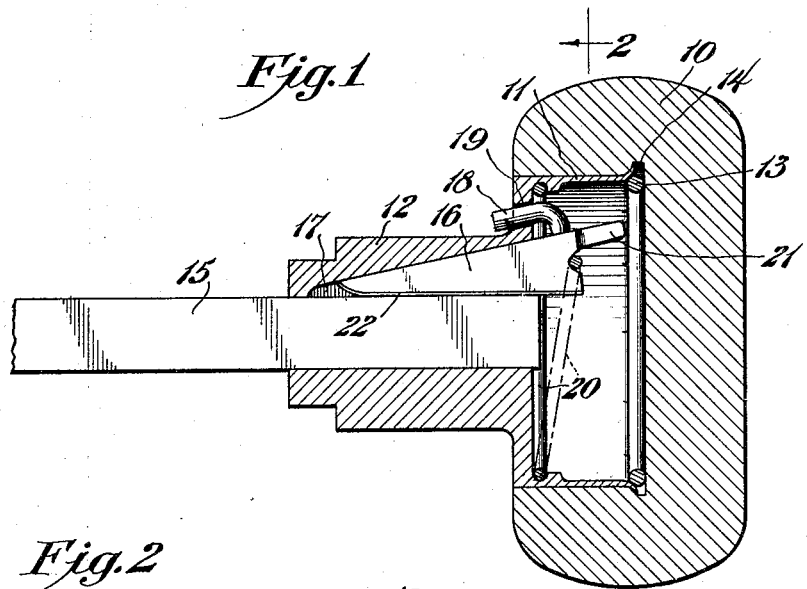
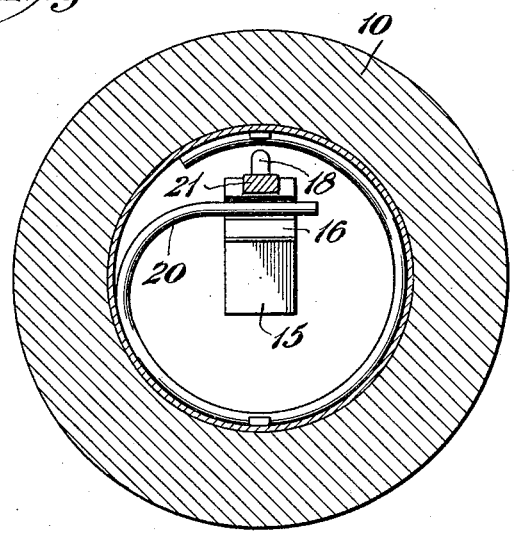
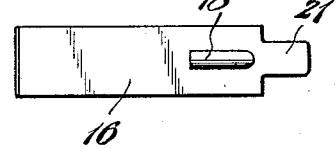
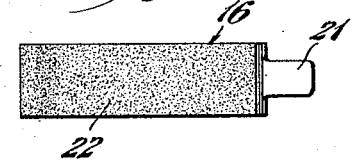
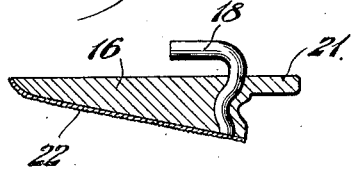
INVENTOR
N. B. Stone
BY A. D. Adams
ATTORNEY Patented Aug. 30, 1932

1,874,139

UNITED STATES PATENT OFFICE

NATHANIEL B. STONE, OF WASHINGTON, DISTRICT OF COLUMBIA

AUTOMATIC SPINDLE GRIP FOR DOORKNOBS

Application filed February 1, 1932. Serial No. 590,241.

This invention relates to an improved automatic spindle grip for door knobs and involves important improvements on the construction shown in my Patent No. 1,831,043. Among other objects, it aims to provide a simple and inexpensive wedge gripping device having a push pin projecting through a guide opening in the hub section of the knob and serving not only to hold the wedge in proper sliding engagement with the hub, but also as an external means for releasing the wedge from the spindle by a simple tool, such as a screw driver or knife blade. Also, the invention contemplates the provision of means to limit the inward movement of the wedge or gripping member. Still another aim is to provide an abrasive coating or surface on the gripping wedge to engage the spindle by positive choking action.

Other aims and advantages of the invention will appear in the specification when considered in connection with the accompanying drawing, wherein:

Fig. 1 is a vertical sectional view showing one embodiment of the invention applied to a solid type of door knob;

Fig. 2 is a sectional view taken on the line 2—2 of Fig. 1;

Fig. 3 is a top plan view of the wedge gripping member shown in Fig. 1;

Fig. 4 is a bottom plan view of the wedge; and

Fig. 5 is a longitudinal sectional view of the wedge.

Referring particularly to the drawing, the preferred form of gripping device is shown as being applied to a knob 10 which may be made of glass, wood or any suitable composition. In this instance, the solid knob section has a recess to receive a cup-shaped extension 11 of the hub section 12. The cup-shaped extension 11 is shown as being secured or locked in the knob section by forcing its inner end over a ring 13 and expanding it outwardly into an annular groove or enlargement 14, the inner end being slitted and beveled to permit it to be expanded by the ring, as shown. It is to be understood that the gripping means may be applied to many other types of knobs.

The illustrated knob is secured to the spindle 15 by means of a metal wedge 16 slidably mounted in a tapered recess 17 in the hub section. In this case, the tapered wedge has plain sides, thereby eliminating the ribs and lateral grooves as shown in my aforesaid patent. The enlarged end of the wedge is shown as having a bent push pin 18 in the form of an L-shaped piece of wire conveniently anchored in the wedge, while it is being cast (see Fig. 5). This push pin is slightly spaced from the outer face of the wedge and projects forwardly parallel with it through a guide opening 19 in the rear wall of the knob. The length of the pin is such that it projects slightly beyond the inner face of the knob or the cup-shaped section when the wedge is in gripping engagement with the spindle, the idea being to permit the wedge to be released by an ordinary screw driver, knife blade or other suitable implement. Also, the bent push pin acts as a stop to limit the forward movement of the wedge.

As is clearly described in my aforesaid patent, the wedge is urged by a spiral spring 20 into gripping engagement with the spindle so that the knob is automatically gripped on the spindle in any position to which it is pushed or forced.

In this example, the rear end of the wedge has a finger or projection 21 to limit the releasing movement of the wedge by striking the bottom wall of the recess in the knob section 10. The wedge requires very little rearward or releasing movement to release its grip on the spindle. By limiting its movement, the push pin 18 is prevented from being disengaged from its guiding opening 19 in the wall of the cup-shaped member. Thus, the push pin serves to retain the wedge in proper sliding engagement with its recess. It cannot fall out of the recess groove when the knob is removed from the spindle.

Instead of employing a knurled or toothed gripping surface on the wedge, as shown in my aforesaid patent, the face of the wedge is here shown as being coated with an abrasive, such as ordinary emery cloth 22 in order to grip the spindle by a positive choking action. This type of gripping surface may be applied very cheaply and reduces the cost of making the wedge. While the active face of the wedge may be coated with any suitable abrasive, the strip of emery cloth is conveniently secured to it by a suitable adhesive.

From the foregoing description, it will be seen that the improved automatic gripping device is very simple. Its parts may be made of any suitable metal, such as stainless steel or bronze. The wedge is conveniently made of brass or some rustproof metal, while the push pin may be made of stainless steel with one end cast in the wedge. If preferred, the pin may terminate flush with the door knob.

Obviously, the present invention is not restricted to the particular embodiment thereof herein shown and described.

What is claimed is:

1. In combination with a door knob having a cover section and a hub section of the character described, a spring urged biting wedge slidably mounted in the hub section and constituting a spindle gripping element; and a push pin associated with the wedge and slidably mounted in the hub section serving as a means to release the wedge, said push pin also normally supporting the wedge in the hub with the small end of the wedge out of the path of the end of the spindle.

2. In combination with a door knob having a cover section and a hub section of the character described, a spring urged biting wedge slidably mounted in the hub section and constituting a spindle gripping element; a push pin associated with the wedge and slidably mounted in one of the knob sections serving as a means to release the wedge, said push pin also normally supporting the wedge in the hub with the small end of the wedge out of the path of the end of a spindle; and a forward projection on the wedge to engage the outer knob section and to limit the sliding movement of the wedge.

3. In a door knob having interlocking sections including a hub, a gripping wedge slidably mounted in the hub; a positive spindle gripping face on the wedge; a bent push pin having one end anchored in the wedge and presenting a portion parallel with and spaced from the outer face of the wedge projecting through a guide opening in the inner wall of the knob so that the push pin serves to restrain the wedge to slide longitudinally in its working position and also as a means for releasing the wedge; front and rear stop means to limit the sliding movement of the wedge; and a spring mounted within the knob normally pressing the wedge toward its spindle gripping position.

In testimony that I claim the foregoing as my own, I have hereto affixed my signature.

NATHANIEL B. STONE.